(12) United States Patent
Schaub et al.

(10) Patent No.: US 12,290,953 B2
(45) Date of Patent: May 6, 2025

(54) SUCTION NOZZLE

(71) Applicant: MULTIVAC SEPP HAGGENMUELLER SE & CO. KG, Wolfertschwenden (DE)

(72) Inventors: Hubert Schaub, Waltenhofen (DE); Markus Waegele, Lautrach (DE); Florian Lutz, Markt Rettenbach (DE); Nadine Reichart, Unterjoch/Bad Hindelang (DE)

(73) Assignee: MULTIVAC Sepp Haggenmueller SE & Co. KG, Wolfertschwenden (DE)

( * ) Notice: Subject to any disclaimer, the term of this patent is extended or adjusted under 35 U.S.C. 154(b) by 291 days.

(21) Appl. No.: 17/962,363

(22) Filed: Oct. 7, 2022

(65) Prior Publication Data
US 2023/0115644 A1 Apr. 13, 2023

(30) Foreign Application Priority Data

Oct. 7, 2021 (DE) .......................... 102021126070.1

(51) Int. Cl.
*B26D 7/18* (2006.01)
(52) U.S. Cl.
CPC .................. *B26D 7/1863* (2013.01)
(58) Field of Classification Search
CPC ....... B26D 7/1863; B26D 7/1854; B26D 7/18
See application file for complete search history.

(56) References Cited

U.S. PATENT DOCUMENTS

| | | | | |
|---|---|---|---|---|
| 5,022,793 A | * | 6/1991 | Hoshino | ............ B23Q 11/0046 406/123 |
| 5,140,880 A | * | 8/1992 | Littleton | ............... B26D 7/1863 83/123 |
| 6,003,418 A | * | 12/1999 | Bezama | ............... B26D 7/1854 83/99 |
| 6,042,341 A | | 3/2000 | Richter | |
| 6,095,023 A | * | 8/2000 | Harada | ................ B25J 15/0616 83/152 |
| 8,998,122 B2 | | 4/2015 | Weiss et al. | |
| 9,999,986 B2 | * | 6/2018 | Mascari | ............... A22B 5/0017 |

(Continued)

FOREIGN PATENT DOCUMENTS

| | | |
|---|---|---|
| DE | 198 50 081 C2 | 5/2003 |
| DE | 10 2006 020 367 A1 | 8/2007 |

(Continued)

OTHER PUBLICATIONS

German Search Report Dated Jun. 24, 2022, Application No. 10 2021 126 070.1, Applicant Multivac Sepp Haggenmueller SE & Co. KG, 6 Pages.
European Search Report (with English Machine Translation) Dated Mar. 13, 2023, Application No. 22198709.2-1103, Applicant Multivac Sepp Haggenmueller SE & Co. KG, 12 Pages.

*Primary Examiner* — Omar Flores Sanchez
(74) *Attorney, Agent, or Firm* — Brooks Kushman P.C.

(57) ABSTRACT

A suction nozzle, which is configured to aspirate a residual film of a film processed by a packaging machine. The suction nozzle comprises a tube assembly comprising a first tube and a second tube, wherein the first tube and the second tube are arranged coaxially with respect to one another and form a suction channel. An annular gap is provided between the first tube and the second tube, through which a gas, preferably air, can be blown into the suction channel.

20 Claims, 3 Drawing Sheets

(56) References Cited

U.S. PATENT DOCUMENTS

| | | | | |
|---|---|---|---|---|
| 2004/0088864 A1* | 5/2004 | Whited | ................ | B26B 25/002 |
| | | | | 30/276 |
| 2010/0050365 A1* | 3/2010 | Inoue | ................ | B23Q 11/0046 |
| | | | | 15/300.1 |
| 2012/0272804 A1* | 11/2012 | Miyauchi | .......... | A61F 13/15723 |
| | | | | 83/100 |
| 2013/0087029 A1* | 4/2013 | Iyatani | ................ | B26D 7/1863 |
| | | | | 83/13 |
| 2016/0031103 A1* | 2/2016 | Mascari | ................ | B26B 25/002 |
| | | | | 30/276 |
| 2016/0031104 A1* | 2/2016 | Mascari | ................ | B26B 25/002 |
| | | | | 30/124 |
| 2017/0210024 A1* | 7/2017 | Mascari | ................... | B26D 7/18 |
| 2018/0339418 A1* | 11/2018 | Bormann | ................ | B26D 1/405 |
| 2023/0264846 A1* | 8/2023 | Hoepner | ................ | B65B 57/00 |
| | | | | 53/453 |

FOREIGN PATENT DOCUMENTS

| | | |
|---|---|---|
| DE | 10 2010 053 444 A1 | 6/2012 |
| DE | 10 2011 100 680 A1 | 11/2012 |
| DE | 10 2011 010 378 B4 | 1/2014 |
| DE | 10 2016 004961 A1 | 10/2017 |
| EP | 3 476 534 A1 | 5/2019 |
| JP | H11 151537 A | 6/1999 |

\* cited by examiner

SUCTION NOZZLE

CROSS-REFERENCE TO RELATED APPLICATIONS

This application claims foreign priority benefits under 35 U.S.C. § 119(a)-(d) to German patent application number DE 10 2021 126 070.1, filed Oct. 7, 2021, which is incorporated by reference in its entirety.

TECHNICAL FIELD

The disclosure relates to a suction nozzle for aspirating a residual film, the suction nozzle being employable on a packaging machine.

BACKGROUND

Packaging machines producing packages from one or more, often sheet formed, films are known. In particular during individualization of the finished packages, residual films accrue, which need to be separated from the finished packages and disposed of. This may be effected by a winder winding residual film onto winding rollers as disclosed for example in DE 10 2011 010 378 B4. Such solutions, however, are only suitable for continuous, for example strip formed, residual films. Alternatively, aspirating devices, such as the one disclosed in DE 10 2006 020 367 A1, are known, which can be connected to so-called edge strip ejectors, such as the one disclosed in DE 10 2010 053 444A1. Conventional aspirating devices are relatively expensive and require large amounts of floor space due to the vacuum compressors and corresponding drives being used for aspirating.

SUMMARY

It is an objective of the present disclosure to provide a suction nozzle, which enables disposal of residual films, which saves cost and space.

A suction nozzle is disclosed, which is configured to aspirate a residual film of a film processed by a packaging machine. The suction nozzle comprises a tube assembly comprising a first tube and a second tube, wherein the first and second tube are disposed coaxially with respect to one another and form a suction channel. The suction nozzle disclosed is characterized in that an annular gap, for which a gas, preferably air, can be blown into the suction channel, is provided between the first and the second tube.

The annular gap, through which a gas, preferably air, can be blown into the suction channel, may enable generation of a pressure difference, which may cause a gas stream, in particular an air stream, flowing through the suction channel. In this way, residual films may be aspiratable into the suction nozzle. The blowing of the gas, in particular of the air, may be effected and/or facilitated by a source of pressurized gas, in particular a source of pressurized air. As a source of pressurized air, for example a compressor or a central pressurized air supply may be considered. In this way, a particularly cost and space efficient aspiration compared to the prior art may be achieved.

An opening or a plurality of openings between the tubes extending annually around the suction channel may be considered an annular gap. This may be a continuous opening, which may mean that the first and the second tube are completely separated at this location. It is, however, also conceivable that the annular gap comprises a plurality of openings. For example, the first and the second tube may be connected to one another by one or a plurality of connecting links. An embodiment in one piece of the first and the second tube is conceivable. The plurality of openings may be generated by drilling, milling or laser cutting. Structures forming a channel, which is at least partially annularly separated by a wall from its environment may be considered as a tube or tube formed. A preferred cross-sectional shape is a circular shape. Other round or polygonal cross-sectional shapes are conceivable as well.

It is conceivable that the annular gap is configured such that a blown in air stream can be blown into the suction channel in a blowing direction, which is oriented at a blow in angle with respect to an axial direction of the tube assembly, wherein the angle is between 0° and 90°, particularly preferred between 0° and 45°. By providing an angle as small as possible with respect to the axial direction, it may be achieved that the airstream through the suction channel caused by the blown in air stream is directed in the desired direction. A direction extending parallel to a common axis of the coaxially disposed tubes may be considered an axial direction, in particular as an axial direction of the tube assembly.

Advantageously, a cross-sectional area of the suction channel may vary along a suction path. In this way, the flow of the current and/or the speed of the current may be selectively influenced. It is particularly beneficial, if a cross-sectional area of the suction channel is smaller at an outlet side of the suction nozzle than at inlet side of the suction nozzle. By such a configuration, the Venturi effect may be used, for example to generate or amplify a desired pressure difference. In this way, an improved suction effect of the suction nozzle may be achieved.

It is imaginable that the suction nozzle has a pressurized gas connector, preferably a pressurized air connector. In many production environments, in which suction nozzles are used in packaging machines, a central pressurized air supply is available, such that operation of the suction nozzle by connecting to a supply of pressurized gas or pressurized air represents a particularly simple and practical solution. In addition, many packaging machines comprise pneumatic systems. Therefore, it may be advantageous, if the presently disclosed suction nozzle is connectable to such supplies of pressurized gas or pressurized air respectively. It is particularly beneficial, if the pressurized gas connector is connected to the annular gap, preferably in an airtight manner, and is configured to conduct a gas, preferably air, to the annular gap. In this way, the pressurized gas or the pressurized air, respectively, may be blowable into the suction channel through the annular gap.

It may be advantageous if a width of the annular gap is adjustable. In particular in case of a constant supply pressure, for example by a pressurized air supply, this may enable adjustability of the blow in speed into the suction channel. Additionally, manufacturing tolerances may be compensated by adjusting the width of the annular gap. It is particularly beneficial, if the width of the annular gap is adjustable by shifting of the first and second tubes relative to one another. This may be a particularly simple way of adjusting the width of the annular gap. In particular the axial width of the annular gap may be adjustable by axial shifting. It is, however, also conceivable that additionally or alternatively, the radial width of the annular gap is adjustable, for example by a cone shaped portion, which may be provided on the first tube and/or on the second tube.

It may be advantageous if the first and the second tubes are screwable with one another. This may, on one hand, facilitate assembly of the tube assembly. Screw connections may be particularly easy to manufacture and assemble. On the other hand, a screw connection may additionally enable adjustability of the width of the annular gap, since the first and the second tube may be shifted axially with respect to each other by screwing them together. It is conceivable, that the first tube has a first thread. It is further conceivable that the second tube has a second thread. The first and the second thread may be configured to engage with each other.

It may be advantageous if the tube assembly comprises a rotational fixing. The rotational fixing may be configured to block and/or brake a turning of the two tubes relative to one another in their screwed together state. In this way, the position of the two tubes relative to one another, in particular a width of the annular gap, may be fixed. The rotational fixing may for example comprise a locking screw.

The application also relates to a packaging machine configured to produce packages from at least one film and comprises at least one suction nozzle of the previously described type. In such a packaging machine, one or more of such suction nozzles may be used particularly advantageous.

BRIEF DESCRIPTION OF THE DRAWINGS

The disclosure relates to a suction nozzle and a packaging machine of the previously described type. In the following, an advantageous embodiment is explained in more detail as an example using drawings.

DETAILED DESCRIPTION

Figure 1:
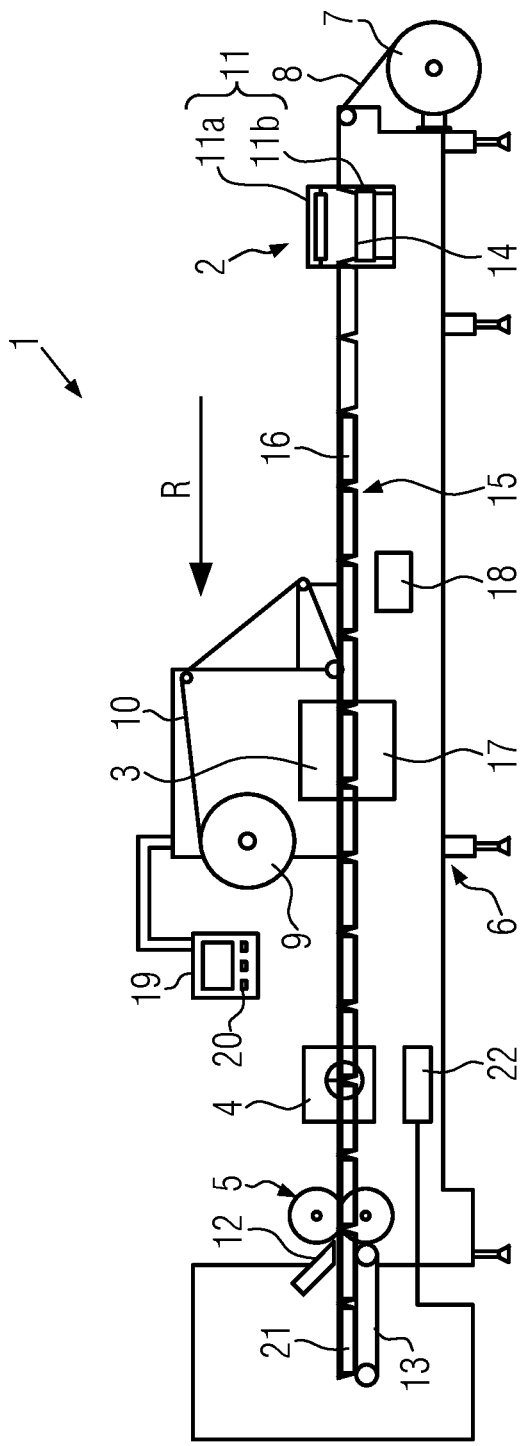
FIG. 1 shows a schematic side view of a packaging machine.

FIG. 1 shows a packaging machine 1 according to the disclosure, which may be, as in the present embodiment, a deep drawing packaging machine, in a schematic view. The packaging machine 1 may comprise a forming station 2, a sealing station 3, a transverse cutting device 4 and a longitudinal cutting device 5. These may be disposed in said sequence along a working direction R at a machine frame 6.

On an input side, a feed roll 7, from which a first film may be pulled, may be provided at the machine frame 6. In the area of the sealing station 3, a film storage 9 may be provided, from which a second film 10 may be pulled as a cover film. On an output side, the packaging machine 1 may provide a discharge device 13, for example in the form of a transport conveyor, with which finished, individualized packages 21 may be transported away. Further, the packaging machine 1 may have a not presently shown feeding device, which may grip the first film 8 and transport it in a working direction R, preferably in an indexed manner in a main working cycle. The feeding device may be realized for example by laterally disposed transport chains, preferably clamping chains.

As illustrated in the shown embodiment, the forming station 2 may be embodied as a deep drawing station. Therein, one or several packaging depressions 14 may be formed into the first film 8 by deep drawing. For this purpose, the forming station 2 may comprise a forming tool 11. The forming tool 11 may comprise a first tool part 11a, in the present embodiment an upper tool 11a, and a second tool part 11b, in the present embodiment a lower tool 11b. The first film 8 may be conveyed between the upper tool 11a and the lower tool 11b.

The forming station 2 can be configured such that several packaging depressions 14 may be formed next to each other in a direction perpendicular to the working direction R. Downstream in the working direction R of the forming station 2, a filling line 15 may be provided. There, the packaging depressions 14 formed into the first film 8 may be filled with product 16.

The sealing station 3 may have a sealable chamber 17, in which an atmosphere in the packaging depressions 14 may be replaced before sealing, for example by gas flushing with a replacement gas or with a replacement gas mix.

The transverse cutting device 4 may be embodied as a die cutter, which may be configured to sever the first film 8 and the second film 10 in a direction transverse to the working direction R between neighboring packaging depressions 14. The transverse cutting device 4 may be configured in such way that the first film 8 is not severed along the entire width but instead at least a lateral portion is not severed. This may enable a controlled transport by the feeding device.

The longitudinal cutting device 5 may, as in the shown embodiment, be embodied as a rotating circular knife assembly, with which the first film 8 and the second film 10 may be severed between neighboring packaging depressions 14 and at the lateral edge of the first film 8, such that individualized packages 21 may be present behind the longitudinal cutting device 5.

The packaging machine 1 may further comprise at least one, in the present embodiment two, suction nozzles 12. The suction nozzle 12 or the suction nozzles 12, respectively, may be disposed at a location along the working direction R, at which individualized packages 21 are generated. In particular, the suction nozzle 12 may be disposed downstream of the longitudinal cutting device 5. The packaging machine 1 may comprise a pneumatic system 22, for example to supply different actuators with pressurized air. The suction nozzle 12 may be connected to the pneumatic system 22.

Packaging machine 1 may further comprise a control unit 18. It may be configured to control and/or monitor processes running in the packaging machine 1. Additionally, a display device 19, preferably having operating elements 20, may be provided and adapted for visualizing and/or influencing of processes in the packaging machine 1 for and/or by an operator.

The general way of working of the packaging machine 1 may occur as briefly described in the following.

The first film 8 may be pulled from the feed roll 7 and transported into the forming station 2 by the feeding device. In the forming station 2, one or more packaging depressions 14 may be formed into the first film 8 by deep drawing. In this process, the first film 8 may at first be warmed, preferably by a heating device. The deep drawing of the depression 14 may be facilitated by injecting pressurized air into the forming tool 11, in particular into the upper tool 11a. After that, the packaging depressions 14 may be transported further to the filling line 15, where they may be filled with product 16.

After that, the filled packaging depressions 14 together with the surrounding portions of the first film 8 may be transported further into the sealing station 3 by the feeding device. The second film 10 may be sealed to the first film 8 as a cover film in the sealing station 3. After that, the second film 10 may be transported further using the feeding motion of the first film 8. In this process, the second film 10 may be pulled from the film storage 9. Closed packages 21 may be formed by sealing the cover film 10 to the packaging depressions 14.

The packages 21 may be individualized in the cutting devices 4, 5 by severing the films 8, 10 in transverse and longitudinal directions, respectively. For individualization, a complete cutting device (not shown), which can individualize the packages 21 in a single step, may be used instead of the cutting devices 4, 5. Residual films 23 (see FIG. 3) generated by individualization of packages 21 may be aspirated by suction nozzle 12.

Figure 2:
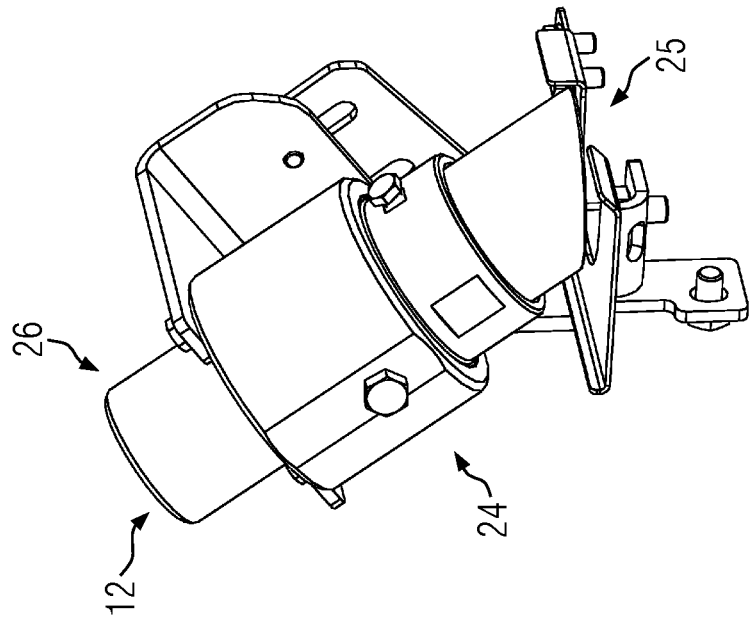
FIG. 2 shows a schematic perspective view of two suction nozzles.
Figure 2:
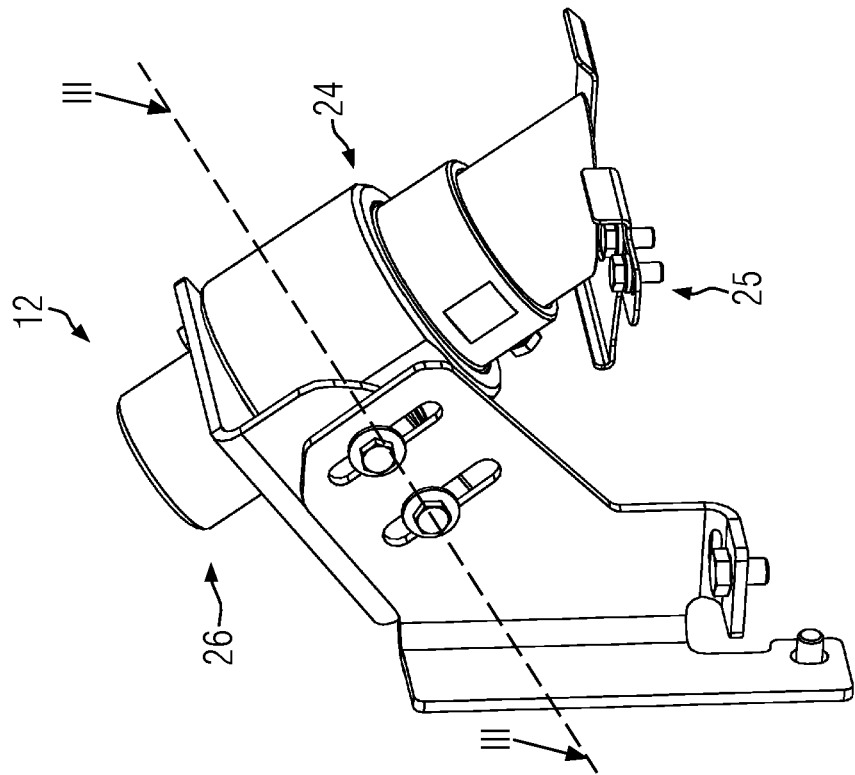

In FIG. 2, the suction nozzles 12 are shown in a perspective view. It becomes visible, that the suction nozzles 12 may each comprise a tube assembly 24. It is equally visible, that the suction nozzles 12 each may have an inlet side 25 and an outlet side 26. The suction nozzles 12 may be configured in such a way that an airstream aspirating residual films 23 enters the suction nozzle 12 at the inlet side 25 and exits the suction nozzle 12 at an outlet side 26.

Figures 3, 3A:
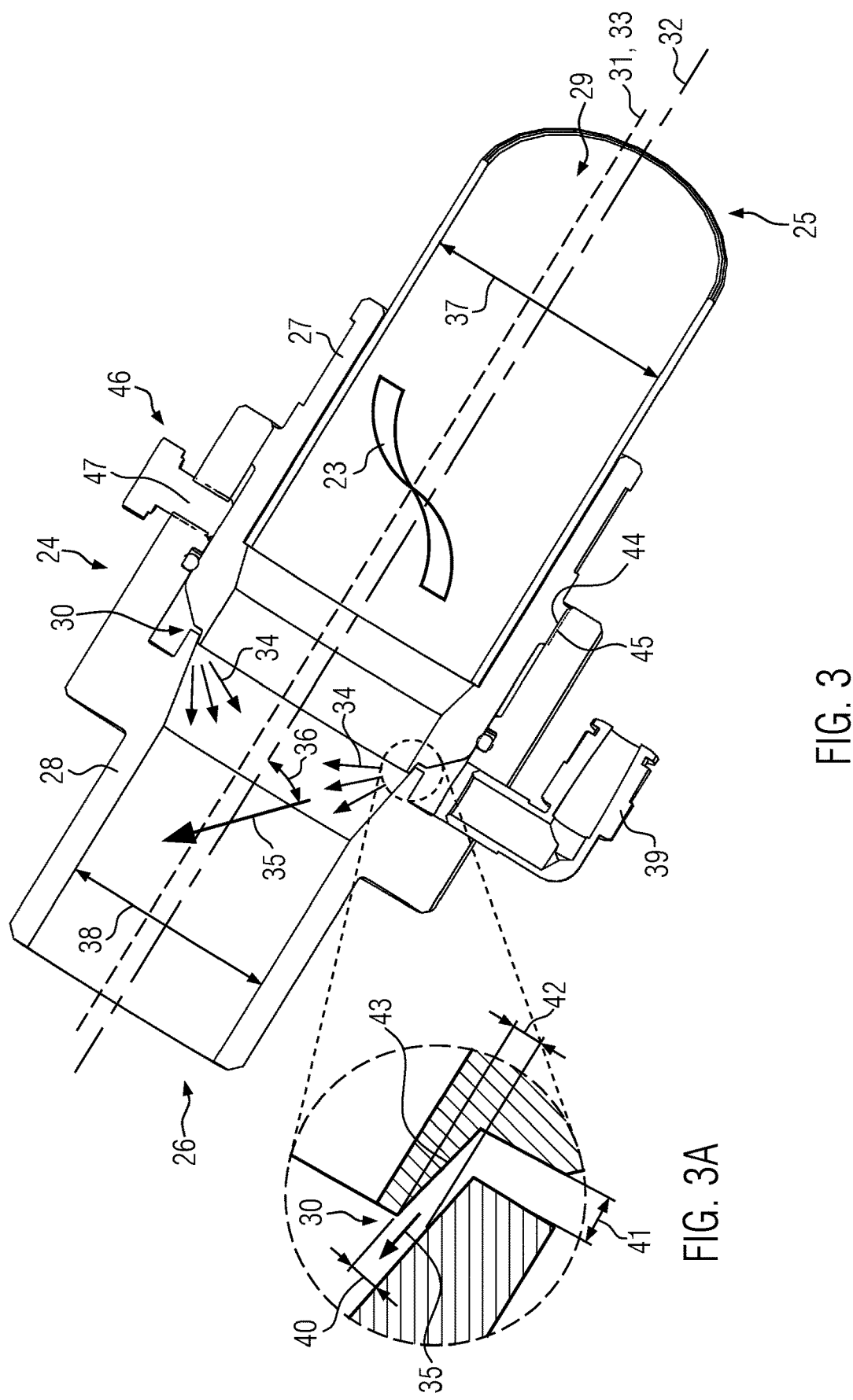
FIG. 3 shows a schematic sectional view of one of the two suction nozzles from FIG. 2.
FIG. 3A shows a schematic detailed view of a portion of FIG. 3.

In FIG. 3, one of the suction nozzles 12 is shown in a schematic sectional view, wherein the sectional plane extends as indicated by lines III-III in FIG. 2. As can be seen in FIG. 3, the tube assembly 24 may comprise a first tube 27 and a second tube 28. The first tube 27 and the second tube 28 may, as in the present embodiment, be disposed coaxially with respect to one another. The common axis is indicated at 32 in FIG. 3. A direction extending parallel to the common axis 32 of the first tube 27 and the second tube 28 may be considered as axial direction 33, in particular as an axial direction and 33 of the tube assembly 24.

The first tube 27 and the second tube 28 may form a suction channel 29. Between the first tube 27 and the second tube 28, an annular gap 30 may be provided. A gas, in the present embodiment air, may be blowable into the suction channel 29 through the annular gap 30. By blowing in through the annular gap 30, a blown in gas stream 34, in the present embodiment a blown in airstream 34, may be generated. The tube assembly 24, in particular the annular gap 30 may be configured to blow the blown in airstream 34 into the suction channel 29 in a blowing direction 35. The blow in direction 35 may be oriented at a blow in angle 36 relative to the axial direction 33. As shown in FIG. 3, the blow in angle 36 may be smaller than 90°.

Air aspirated by the suction nozzle 12 may be suckable through the suction channel 29 along a suction path 31. In other words, the suction nozzle 12 may be configured to suction the air aspirated by it through the suction channel 29 along the suction path 31. The cross-sectional area of the suction channel 29 may vary along the suction path 31. In particular, a cross-sectional area 37 of the suction channel 29 may be larger at the inlet side 25 than a cross-sectional area 38 of the suction channel 29 at the outlet side 26 of the suction nozzle 12.

The suction nozzle 12 may have a pressurized gas connector, in the present embodiment a pressurized air connector 39. As shown in the present embodiment, the pressurized air connector 39 may be connected to the annular gap 30, preferably in an airtight manner. The pressurized air connector may be configured to conduct air to the annular gap 30.

The annular gap 30 may have a width 40 (see FIG. 3A). The width 40 may be defined perpendicularly with respect to the blowing direction 35. The extension of the annular gap 30 may further be describable by its axial width 41 and/or by its radial widths 42. The axial width 41 may be defined in parallel with respect to the axial direction 33. The radial width 42 may be defined perpendicular with respect to the axial width and/or with respect to the axial direction 33.

The widths 40, 41, 42 may be adjustable. Which ones of the widths 40, 41, 42 are adjustable in particular, may be defined by a suitable geometry of the first tube 27 and the second tube 28. As shown in the present embodiment for example, a conical portion 43 may be provided at the first tube 27. The conical portion 43 may be configured to adjust in particular the radial widths 42 of the annular gap 30 when an axial shifting of the first tube 27 and the second tube 28 relative to one another occurs. Depending on the geometry of the first and second tube 27, 28, at least one of the widths 40, 41, 42 may be adjustable by axial shifting of the first tube 27 and the second tube 28 with respect to one another.

As shown in FIG. 3, the first tube 27 and the second tube 28 may be screwable to one another. A screw connection of the first tube 27 with the second tube 28 may be configured for assembly of the two tubes 27, 28 to one another. Alternatively or additionally, a screw connection of the first tube 27 with the second tube 28 may be configured to achieve an axial shifting of the two tubes 27, 28 relative to one another. As in the present embodiment, the first tube 27 may have a first thread 44. The second tube 28 may have a second thread 45. The first thread 44 and the second thread 45 may be configured to engage with one another. Thereby, the first tube 27 and the second tube 28 may be screwable to one another.

As mentioned, by screwing the first tube 27 to the second tube 28, an assembly of those two with one another and/or adjustability of one of the widths 40, 42, 43 of the annular gap 30 may be achieved. It may be advantageous, if the tube assembly 24 comprises a rotational fixing 46. The rotational fixing 46 may be configured to block and/or brake a turning of the two tubes 27, 28 relative to one another in a screwed together state. For example, the rotational fixing 46 may comprise a locking screw 47.

What is claimed is:

1. A suction nozzle, which is configured to aspirate a residual film of a film processed by a packaging machine, wherein the suction nozzle comprises a tube assembly comprising a first tube and a second tube, wherein the first tube and the second tube are arranged coaxially with respect to one another and form a suction channel, wherein an annular gap, through which a gas can be blown into the suction channel, is provided between the first tube and the second tube, and wherein a width of the annular gap is adjustable.

2. The suction nozzle according to claim 1, wherein the annular gap is configured such that a blown-in air stream can be blown into the suction channel in a blow in direction, which is oriented at a blow in angle with respect to an axial direction of the tube assembly, wherein the angle is between 0 degrees and 90 degrees.

3. The suction nozzle according to claim 2, wherein the blow in angle is between 0 degrees and 45 degrees.

4. The suction nozzle according to claim 1, wherein a cross-sectional area of the suction channel varies along a suction path.

5. The suction nozzle according to claim 1, wherein a cross-sectional area of the suction channel is smaller at an outlet side of the suction nozzle than at an inlet side of the suction nozzle.

6. The suction nozzle according to claim 1, wherein the suction nozzle has a pressurized gas connector.

7. The suction nozzle according to claim 6, wherein the pressurized gas connector is a pressurized air connector.

8. The suction nozzle according to claim 6, wherein the pressurized gas connector is connected to the annular gap and is configured to route a gas to the annular gap.

9. The suction nozzle according to claim 8, wherein the pressurized gas connector is connected to the annular gap in an airtight manner.

10. The suction nozzle according to claim 1, wherein the width of the annular gap is adjustable by axially shifting of the first tube and the second tube relative to one another.

11. The suction nozzle according to claim 1, wherein the first tube and the second tube are screwable to one another.

12. The suction nozzle according to claim 1, wherein the first tube has a fist-first thread.

13. The suction nozzle according to claim 1, wherein the second tube has a second thread.

14. A packaging machine, which is configured to produce packages from at least one film and comprises at least one suction nozzle according to claim 1.

15. A suction nozzle, which is configured to aspirate a residual film of a film processed by a packaging machine, wherein the suction nozzle comprises a tube assembly comprising a first tube and a second tube, wherein the first tube and the second tube are arranged coaxially with respect to one another and form a suction channel, wherein an annual gap, through which a gas can be blown into the suction channel, is provided between the first tube and the second tube, and wherein the first tube and the second tube are screwable to one another.

16. The suction nozzle according to claim 15, wherein a width of the annular gap is adjustable, and the suction nozzle further comprises a pressurized gas connector.

17. A packaging machine, which is configured to produce packages from at least one film and comprises at least one suction nozzle according to claim 15.

18. A suction nozzle, which is configured to aspirate a residual film of a film processed by a packaging machine, wherein the suction nozzle comprises a tube assembly comprising a first tube and a second tube, wherein the first tube and the second tube are arranged coaxially with respect to one another and form a suction channel, wherein an annular gap, through which a gas can be blown into the suction channel, is provided between the first tube and the second tube, and wherein the first tube has a first thread and/or the second tube has a second thread.

19. The suction nozzle according to claim 18, wherein a cross-sectional area of the suction channel varies along a suction path, and the suction nozzle has a pressurized gas connector.

20. A packaging machine, which is configured to produce packages from at least one film and comprises at least one suction nozzle according to claim 18.

* * * * *